United States Patent
Schwaller

(10) Patent No.: US 8,727,707 B2
(45) Date of Patent: May 20, 2014

(54) INTAKE DUCT LINER FOR A TURBOFAN GAS TURBINE ENGINE

(75) Inventor: Peter Jean Gabriel Schwaller, Oakwood (GB)

(73) Assignee: Rolls-Royce PLC (GB)

( * ) Notice: Subject to any disclaimer, the term of this patent is extended or adjusted under 35 U.S.C. 154(b) by 677 days.

(21) Appl. No.: 12/774,039

(22) Filed: May 5, 2010

(65) Prior Publication Data

US 2010/0290892 A1 Nov. 18, 2010

(30) Foreign Application Priority Data

May 12, 2009 (GB) .................................. 0908128.2

(51) Int. Cl.
*F01D 25/04* (2006.01)

(52) U.S. Cl.
USPC .......................................................... 415/119

(58) Field of Classification Search
USPC .......... 415/119, 173.1, 914; 181/214; 244/1 N
See application file for complete search history.

(56) References Cited

U.S. PATENT DOCUMENTS

| | | | | | |
|---|---|---|---|---|---|
| 3,831,710 | A | * | 8/1974 | Wirt | 181/286 |
| 4,122,672 | A | * | 10/1978 | Lowrie | 60/226.1 |
| 4,235,303 | A | * | 11/1980 | Dhoore et al. | 181/214 |
| 4,421,201 | A | * | 12/1983 | Nelsen et al. | 181/214 |
| 4,732,532 | A | * | 3/1988 | Schwaller et al. | 415/119 |
| 6,123,170 | A | * | 9/2000 | Porte et al. | 181/214 |
| 7,124,856 | B2 | * | 10/2006 | Kempton et al. | 181/284 |
| 7,857,093 | B2 | * | 12/2010 | Sternberger et al. | 181/213 |
| 2006/0169533 | A1 | * | 8/2006 | Patrick | 181/210 |
| 2007/0102234 | A1 | * | 5/2007 | Prasad et al. | 181/214 |
| 2008/0181769 | A1 | * | 7/2008 | Wilson et al. | 415/181 |

FOREIGN PATENT DOCUMENTS

GB 1522558 8/1978
GB 2453941 A 4/2009

* cited by examiner

*Primary Examiner* — Edward Look
*Assistant Examiner* — Liam McDowell
(74) *Attorney, Agent, or Firm* — McCormick, Paulding & Huber LLP

(57) ABSTRACT

A turbofan gas turbine engine includes a fan and an intake duct upstream of the fan. The fan has a fan rotor having a plurality of fan blades. The intake duct has a liner, which includes an acoustic liner positioned upstream of the fan and a buzz-saw tone noise liner positioned upstream of the acoustic liner. The buzz-saw tone noise liner is positioned substantially at, or near, an upstream end of the intake duct. The intake duct has a lip and the buzz-saw tone noise liner is positioned at, or near, the lip.

12 Claims, 2 Drawing Sheets

INTAKE DUCT LINER FOR A TURBOFAN GAS TURBINE ENGINE

CROSS REFERENCE TO RELATED APPLICATION

This application is entitled to the benefit of British Patent Application No. GB 0908128.2, filed on May 12, 2009.

FIELD OF THE INVENTION

The present invention relates to an intake duct liner for a turbofan gas turbine engine.

BACKGROUND OF THE INVENTION

It is known from our U.S. Pat. No. 4,122,672 to provide a deep buzz-saw tone noise liner directly upstream of a fan in an intake duct of a turbofan gas turbine engine to reduce low frequency buzz-saw noise levels and to provide a shallower acoustic liner upstream of the buzz-saw tone noise liner in the intake duct of the turbofan gas turbine engine.

Buzz-saw noise, also called multiple tone noise or combination tone noise, occurs when the tips of the fan blades of a fan of a turbofan gas turbine engine rotate with supersonic velocities. The spectrum of buzz-saw noise contains energy in a wide range of harmonics of the engine rotation frequency; as opposed to blade passing frequency (BPF) harmonics when the tips of the fan blades of a fan of a turbofan gas turbine engine rotate with subsonic velocities. The source of the noise is the rotor alone noise which is now cut-on and this propagates up the intake duct in the form of shock waves and expansion fans; an N wave pattern. Because of slight differences in fan blades, the shocks are different from fan blade to fan blade and this is why the spectrum contains harmonics of the engine rotation frequency. Acoustic levels are typically high, 180 dB near the fan.

However, the buzz-saw tone noise propagates non-linearly in an upstream direction from the fan within the intake duct and there may be a large exchange of energy between different tone frequencies. These tones are multiples of the engine order frequencies and the deep buzz-saw tone noise liner is designed to attenuate a certain range of low order engine order frequencies, which are particularly prone to transmit through the wall of an aircraft cabin. However, because the buzz-saw tone noise propagation is non-linear, noise may leak back into these sensitive frequencies after the noise has passed the deep buzz-saw tone noise liner so that the effectiveness of the buzz-saw tone noise liner at the sensitive frequencies is reduced. This is particularly true if the engine order tone level is initially low due to liner attenuation.

SUMMARY OF THE INVENTION

Accordingly, the present invention seeks to provide a novel intake duct liner for a turbofan gas turbine engine, which reduces, preferably overcomes, the above-mentioned problem.

Accordingly, the present invention provides a turbofan gas turbine engine including a fan and an intake duct upstream of the fan. The fan has a fan rotor with a plurality of fan blades. The intake duct has a liner that includes an acoustic liner positioned upstream of the fan and a buzz-saw tone noise liner positioned upstream of the acoustic liner, the buzz-saw tone noise liner has a greater depth than the acoustic liner.

A buzz-saw tone noise liner is a liner arranged to reduce the low frequency buzz-saw noise produced when the tips of the fan blades rotate with supersonic velocities and there are slight differences in the fan blades.

Preferably, the buzz-saw tone noise liner is positioned substantially at, or near, an upstream end of the intake duct.

Preferably, the intake duct has a lip and the buzz-saw tone noise liner is positioned at, or near, the lip.

Preferably, the acoustic liner extends substantially the whole of the axial distance from the fan to the buzz-saw tone noise liner.

Preferably, the acoustic liner has a radial depth between 12 mm and 76 mm.

Preferably, the buzz-saw tone noise liner has a radial depth of between 50 mm and 254 mm.

The buzz-saw tone noise liner may have a depth of 203 mm to attenuate buzz-saw tone noise at a frequency around 400 Hz.

The buzz-saw tone noise liner may have a depth of 254 mm to attenuate buzz-saw tone noise at a frequency of around 335 Hz.

Preferably, the buzz-saw tone noise liner has depth=speed of sound/(4× frequency of buzz-saw tone noise).

Preferably, the acoustic liner includes a perforate honeycomb liner, a linear liner or a bulk absorber liner.

Preferably, the buzz-saw tone noise liner includes a perforate honeycomb liner, a linear liner or a bulk absorber liner.

The resistance of the liner is between 1 and 3 rhoc.

The present invention also provides a turbofan gas turbine engine intake duct having a liner that has an acoustic liner positioned upstream of a fan and a buzz-saw tone noise liner positioned upstream of the acoustic liner, the buzz-saw tone noise liner has a greater depth than the acoustic liner.

Preferably, the buzz-saw tone noise liner is positioned substantially at, or near, an upstream end of the intake duct.

Preferably, the intake duct has a lip and the buzz-saw tone noise liner is positioned at, or near, the lip.

Preferably, the acoustic liner extends substantially the whole of the axial distance from the fan to the buzz-saw tone noise liner.

DETAILED DESCRIPTION OF THE PREFERRED EMBODIMENTS

Figure 1:
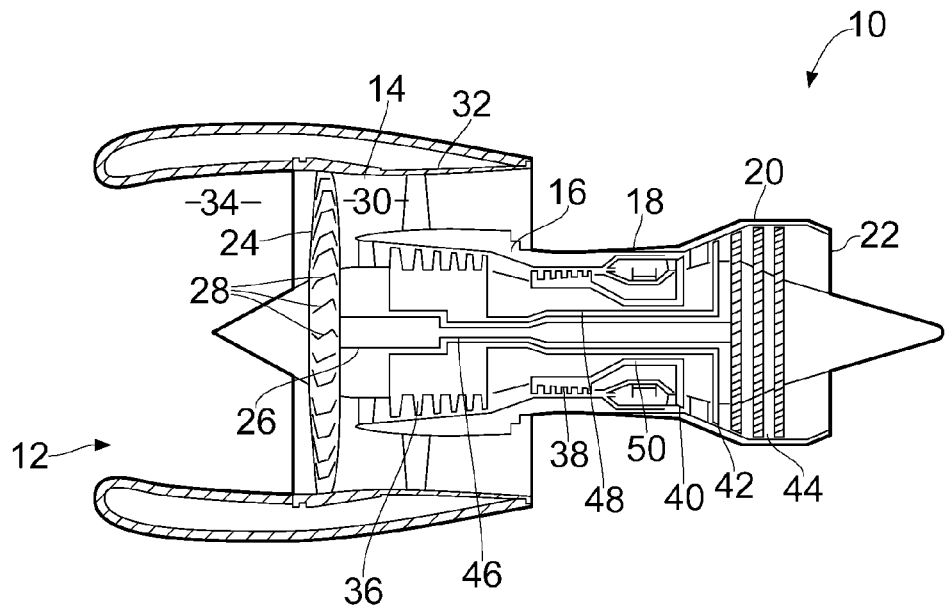
FIG. 1 shows a turbofan gas turbine engine having an intake duct liner according to the present invention.

A turbofan gas turbine engine 10, as shown in FIG. 1, comprises in axial flow series an intake 12, a fan section 14, a compressor section 16, a combustion section 18, a turbine section 20 and an exhaust 22. The fan section 14 comprises a fan 24, which includes a fan rotor 26 carrying a plurality of circumferentially spaced radially outwardly extending fan blades 28. The fan blades 28 extend across a fan duct 30 defined at its radially outer by a fan casing 32. An intake duct 34 is positioned axially upstream of the fan 24 and is also defined at its radially outer extremity by the fan casing 32. The compressor section 16 comprises an intermediate pressure compressor 36 and a high-pressure compressor 38. The turbine section 20 comprises a high-pressure turbine 40, an intermediate pressure turbine 42 and a low-pressure turbine 44. The low pressure turbine 44 is arranged to drive the fan 24 via a first shaft 46, the intermediate pressure turbine 42 is arranged to drive the intermediate pressure compressor 36 via a second shaft 48 and the high pressure turbine 40 is arranged to drive the high pressure compressor 38 via a third shaft 50.

The turbofan gas turbine engine 10 operates quite conventionally and its operation will not be discussed further.

Figure 2:
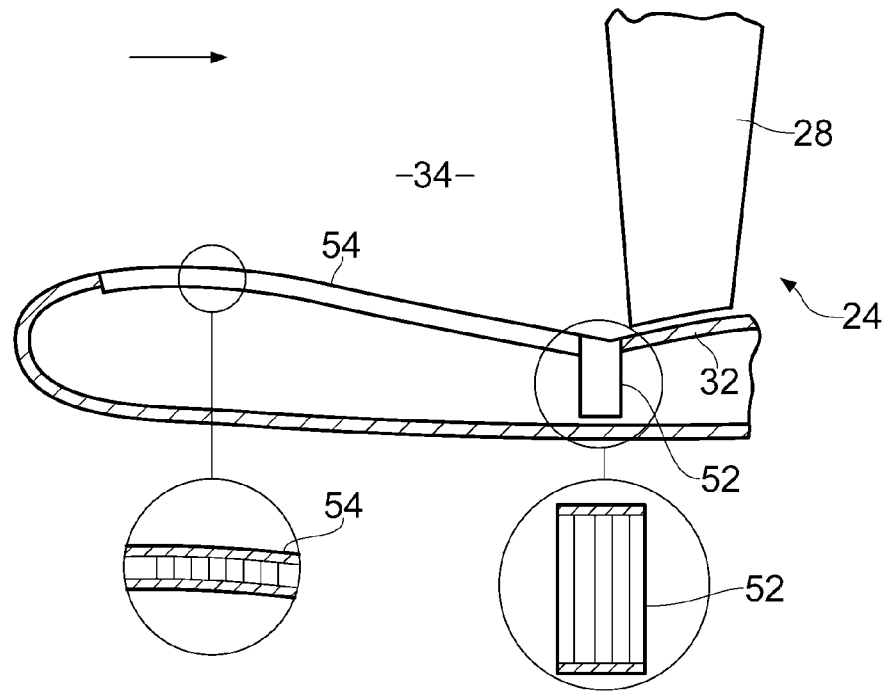
FIG. 2 is an enlarged cross-sectional view of half of an intake duct of a turbofan gas turbine engine having an intake duct liner according to the prior art.

As mentioned previously in the prior art, as shown in FIG. 2, a deep buzz-saw tone noise liner 52 is positioned in the intake duct 34 of the turbofan gas turbine engine 10 immediately upstream of the fan 24 to reduce low frequency buzz-saw noise levels and a shallower acoustic liner 54 is positioned upstream of the buzz-saw tone noise liner 52 in the intake duct 34 of the turbofan gas turbine engine 10. Thus, the buzz-saw tone noise liner 52 and the acoustic liner 54 are positioned in and secured to the fan casing 32 and actually define the surface of the intake duct 34. However, as previously mentioned because the buzz-saw tone noise propagation is non-linear, noise may leak back into these sensitive frequencies after the noise has passed the deep buzz-saw tone noise liner 52 so that the effectiveness of the buzz-saw tone noise liner 52 at the sensitive frequencies is reduced. This is particularly true if the engine order tone level is initially low due to liner attenuation.

Figure 4:
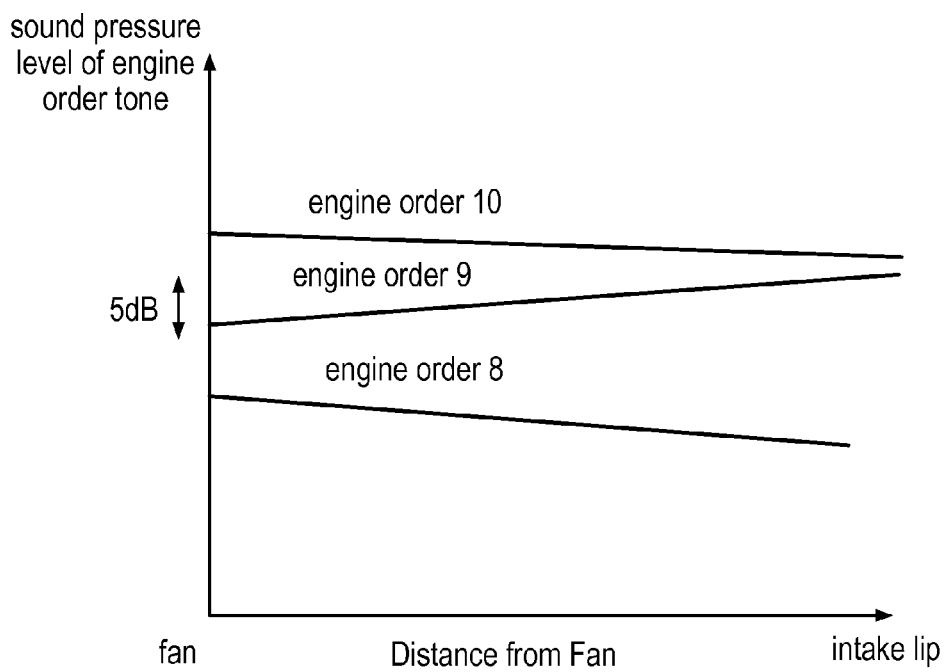
FIG. 4 shows a graph showing sound pressure level of engine order tone in an intake duct against distance axially along the intake duct upstream of the fan.

As an example of a particular situation, FIG. 4 shows sound pressure level of engine order 8, engine order 9 and engine order 10 for different axial distances along the intake duct in an upstream direction from the fan. This shows that the sound pressure level of the engine order 10 is greater than that for the engine order 9, which is greater than that for engine order 8. The graph also shows that the sound pressure level for engine orders 8 and 10 decreases with axial distance but the sound pressure level for engine order 9 increases with axial distance. In other situations the sound pressure levels of the engine orders may be different, but there is nearly always some non-linear propagation of the engine order tones.

Figure 3:
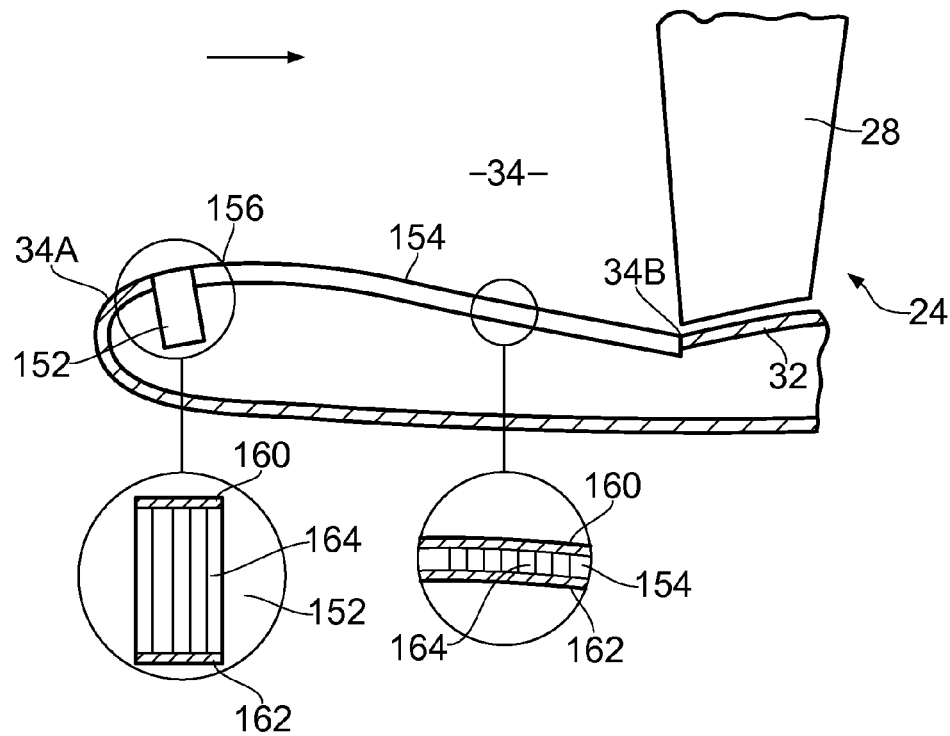
FIG. 3 is an enlarged cross-sectional view of half of an intake duct of a turbofan gas turbine engine having an intake duct liner according to the present invention.

In the present invention, as shown in FIG. 3, the intention is to make the buzz-saw tone noise liner more effective, the buzz-saw tone noise liner 152 is repositioned in the intake duct 34 such that it is upstream of the shallower acoustic liner 154. Thus the buzz-saw tone noise liner 152 is deeper, e.g., radially deeper, than the acoustic liner 154. Again the buzz-saw tone noise liner 152 and the acoustic liner 154 are positioned in and secured to the fan casing 32 and actually define the surface of the intake duct 34. The repositioning of the buzz-saw tone noise liner 152 allows the non-linear propagation to occur within the intake duct 34 before reaching the buzz-saw tone noise liner 152 so that the buzz-saw tone noise liner 152 may attenuate the low order engine order frequencies, which affect the community noise and also are particularly prone to transmit through the wall of the aircraft cabin and the attenuation is not reduced because of non-linear propagation. Thus, the buzz-saw tone noise liner 152 becomes more effective at reducing low order engine order frequencies, which are particularly prone to transmit through the wall of an aircraft cabin and/or affect community noise.

As shown in FIG. 3 the buzz-saw tone noise liner 152 is positioned substantially at, or near, a lip 156 in the intake duct 34 and thus is near the upstream end 34A of the intake duct 34. The lip 156 of the intake duct 34 is a position of minimum cross-sectional area, or at a position near to a minimum cross-sectional area, of the intake duct 34. The shallower acoustic liner 154 extends substantially the whole of the axial distance from the fan 24, the downstream end 34B of the intake duct 34, to the buzz-saw tone noise liner 152 near the upstream end 34A of the intake duct 34.

The acoustic liner 154 has a radial depth between ½ inch, 12 mm, and 3 inches, 76 mm and the buzz-saw tone noise liner 152 has a radial depth of between 2 inches, 50 mm, and 10 inches, 254 mm. In an example the buzz-saw tone noise liner 152 has a depth of 8 inches, 203 mm, to attenuate buzz-saw tone noise at 400 Hz. More generally, the buzz-saw tone noise liner 152 has depth=speed of sound/(4× frequency of buzz-saw tone noise). A buzz-saw tone noise liner with a depth of 10 inches, 254 mm, attenuates buzz-saw tone noise at 335 Hz and a buzz-saw tone noise liner with a depth of 2 inches, 50 mm, attenuates buzz-saw tone noise at 1700 Hz.

The acoustic liner 154 comprises a perforate honeycomb liner, a linear liner or a bulk absorber liner. The buzz-saw tone noise liner 152 comprises a perforate honeycomb liner, a linear liner, a bulk absorber liner or some other kind of low frequency active liner. The resistance of the acoustic liner 152 and/or the buzz-saw tone noise liner 152 is between 1 and 3 rhoc.

The honeycomb liner for the acoustic liner 154 and/or the buzz-saw tone noise liner 152 comprises a perforate facing sheet 160, an imperforate backing sheet 162 and a honeycomb 164 secured to the perforate facing sheet 160 and the imperforate backing sheet 162. The honeycomb liner may comprise a metal, e.g. aluminium, titanium or steel, or a composite e.g. a fibre reinforced material.

What is claimed is:

1. A turbofan gas turbine engine comprising:
   a fan,
   an intake duct with a liner upstream of the fan,
   a fan rotor having a plurality of fan blades,
   the intake duct liner including an acoustic liner positioned upstream of the fan and a buzz-saw tone noise liner positioned upstream of the acoustic liner, the buzz-saw tone noise liner has a greater depth than the acoustic liner, wherein the buzz-saw tone noise liner is positioned substantially at, or near, an upstream end of the intake duct, the intake duct has a lip and the buzz-saw tone noise liner is positioned at, or near, the lip, which is at a position selected from the group consisting of a position of minimum cross-sectional area of the intake duct and a position close to a position of minimum cross-sectional area of the intake duct, and the buzz saw tone noise liner is positioned upstream of the position of minimum cross-sectional area of the intake duct.

2. The turbofan gas turbine engine as claimed in claim 1 wherein the acoustic liner extends substantially the whole of the axial distance from the fan to the buzz-saw tone noise liner.

3. The turbofan gas turbine engine as claimed in claim 1 wherein the acoustic liner has a radial depth between 12 mm and 76 mm.

4. The turbofan gas turbine engine as claimed in claim 1 wherein the buzz-saw tone noise liner has a radial depth of between 50 mm and 254 mm.

5. The turbofan gas turbine engine as claimed in claim 1 wherein the buzz-saw tone noise liner has a depth of 203 mm to attenuate buzz-saw tone noise at frequency around 400 Hz.

6. The turbofan gas turbine engine as claimed in claim 1 wherein the buzz-saw tone noise liner has a depth of 254 mm to attenuate buzz-saw tone noise at a frequency around 335 Hz.

7. The turbofan gas turbine engine as claimed in claim 1 wherein the buzz-saw tone noise liner has depth=speed of sound/(4× frequency of buzz-saw tone noise).

8. The turbofan gas turbine engine as claimed in claim 1 wherein the acoustic liner is selected from the group consisting of a perforate honeycomb liner, a linear liner and a bulk absorber liner.

9. The turbofan gas turbine engine as claimed in claim 1 wherein the buzz-saw tone noise liner is selected from the group consisting of a perforate honeycomb liner, a linear liner and a bulk absorber liner.

10. The turbofan gas turbine engine as claimed in claim 1 wherein the resistance of the acoustic liner is between 1 and 3 rhoc and the resistance of the buzz-saw tone noise liner is between 1 and 3 rhoc.

11. The turbofan gas turbine engine as claimed in claim 1 wherein the acoustic liner has a radial depth between 12 mm and 76 mm and the buzz-saw tone noise liner has a radial depth between 50 mm and 254 mm.

12. The turbofan gas turbine engine as claimed in claim 11 wherein the buzz-saw tone noise liner has a radial depth between 203 mm and 254 mm.

\* \* \* \* \*